June 17, 1958     J. D. FINE     2,839,014
CANDY CANE FORMING MACHINE

Filed Feb. 28, 1957     2 Sheets-Sheet 1

FIG. I

John D. Fine,
    INVENTOR.

BY Loyal J. Miller
    ATTORNEY

June 17, 1958  J. D. FINE  2,839,014
CANDY CANE FORMING MACHINE
Filed Feb. 28, 1957  2 Sheets-Sheet 2

John D. Fine,
INVENTOR.

BY Loyal J. Miller
ATTORNEY

United States Patent Office 2,839,014
Patented June 17, 1958

2,839,014

CANDY CANE FORMING MACHINE

John D. Fine, Oklahoma City, Okla.

Application February 28, 1957, Serial No. 643,131

13 Claims. (Cl. 107—4)

The present invention relates to candy making machines, and more particularly to an apparatus for forming and cutting candy canes.

The prior art reveals a number of machines for forming candy canes, but most of these devices approach the problem of forming the hook of the cane by first severing the rope of candy into selected lengths and then bending the length of candy at a selected point to form the crooked end. In operation these machines perform very well, but require a considerable amount of complicated and precision timed component parts for performing the operation. This is objectionable to the relatively small business candy maker from the standpoint of original cost of the machine and the necessary upkeep of the equipment.

It is therefore the principal object of this invention to provide an apparatus for receiving a continuous rope of warm pliable stick candy which is manually wound in a zig-zag manner around mandrels carried by the apparatus, and then severed into a plurality of candy canes of uniform length.

An additionally important object is to provide a device of this class which is simple in operation and has relatively few moving parts to become worn or get out of order.

Another object is to provide a device of this class by which the diameter or length of candy canes being formed may be varied as desired.

Another object is to provide a device of this character which continuously ejects the formed candy canes onto a conveyor belt, or the like, in an uninterrupted sequence.

A further object is to provide a device of this class in which the winding of the candy rope around mandrels carried by the machine forms the desired crook of a candy cane.

Yet another object is to provide a machine of this character which severs or substantially cuts the rope of candy into sections to form candy canes after the forming action has been completed.

The instant invention accomplishes these and other objects by providing a cylindrical power driven drum journaled on a horizontal axle carried by a frame. The drum is provided with two longitudinally spaced-apart circumferential rows of radially spaced-apart mandrels projecting radially outwardly beyond the periphery of the drum through cooperating perforations therein for winding a rope of candy around the outwardly disposed ends of the mandrels. The inwardly disposed ends of the mandrels are spring urged to bear against cam surfaced means carried by the drum axle so that the outwardly disposed ends of the mandrels are withdrawn or retracted into the plane of the periphery of the drum at a selected point for releasing the rope of candy.

A pair of rotating knives or cutters, carried by the frame on an axle in parallel spaced relation with relation to the periphery of the drum, severs the rope of candy at selected points as the drum is rotated toward the candy ejection point.

Other objects will be apparent from the following description when take in conjunction with the accompanying two sheets of drawings, wherein.

Like characters of reference designate like parts in those figures of the drawings in which they occur.

In the drawings.

Figure 1:
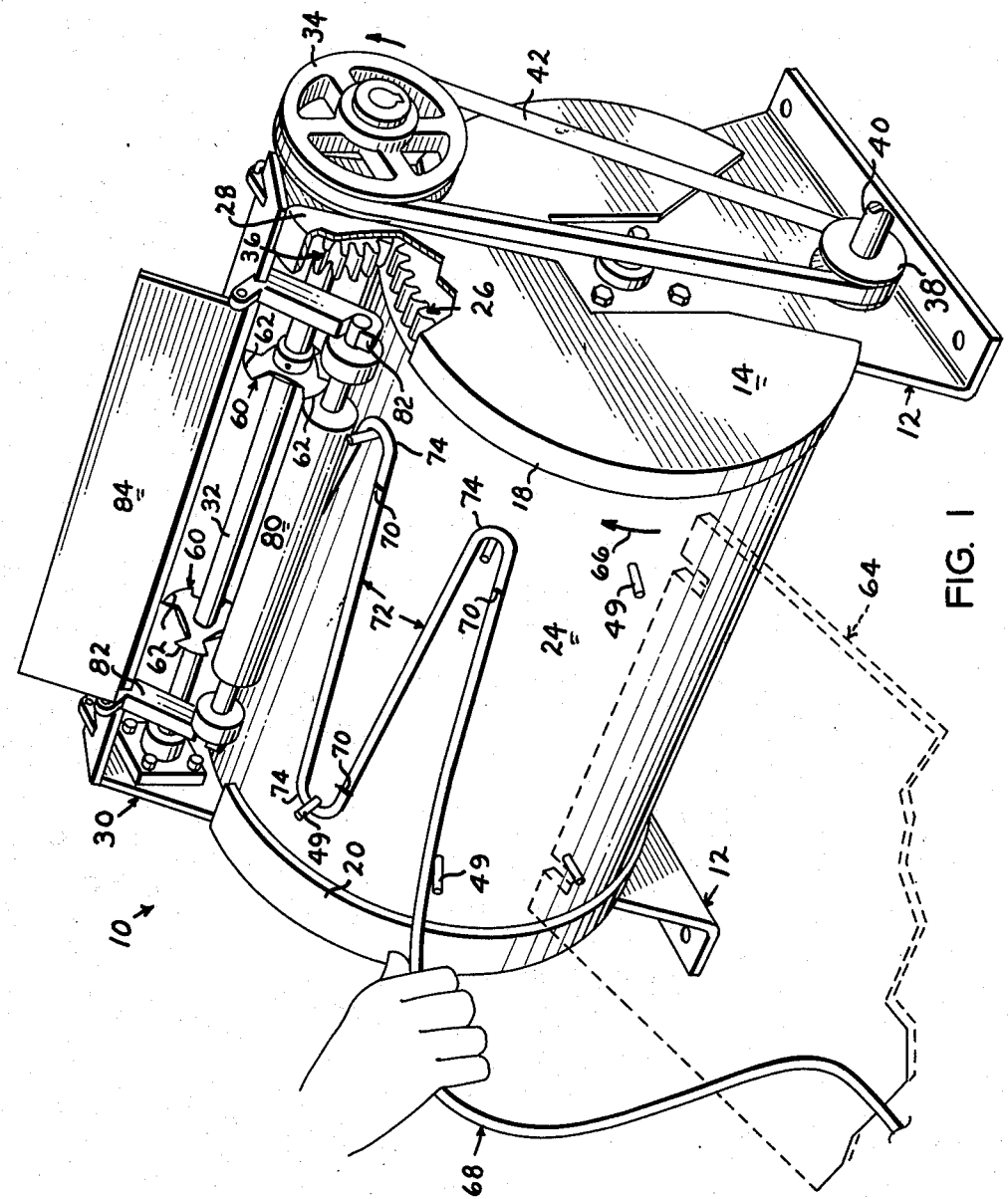
Figure 1 is a perspective view of the device in operation.

The reference numeral 10 indicates the device, as a whole, comprising a frame having base members 12 which support frame end members 14 and 16. The end members 14 and 16 rigidly support a horizontally disposed axle 22. A hollow cylindrical drum 24 is axially journaled by the axle 22 between the end members 14 and 16. Diametrically the end members 14 and 16 may be any desired size and the opposing end portions of the drum are preferably loosely received within the cooperating flanged edges 18 and 20. One end of the drum 24 is provided with a circumferential row of gear teeth 26 disposed adjacent the periphery of the drum within the flange 18. A portion of each end member 14 and 16 is extended angularly upward in parallel relation, as at 28 and 30, respectively. A shaft 32 is journaled by the end portions 28 and 30 in spaced-apart parallel relation with the periphery of the drum 24. One end of the shaft 32 extends outwardly beyond the end portion 28 a selected distance for axially receiving a driven pulley 34. The shaft 32 is further provided with a toothed gear wheel 36 in cooperative engagement with the gear teeth 26. A driven pulley 38 carried by the driven shaft 40 of the electric motor, not shown, is drivably connected to the driven pulley 34, as by belting 42, for driving the shaft 32 and rotating the drum 24.

Figure 2:
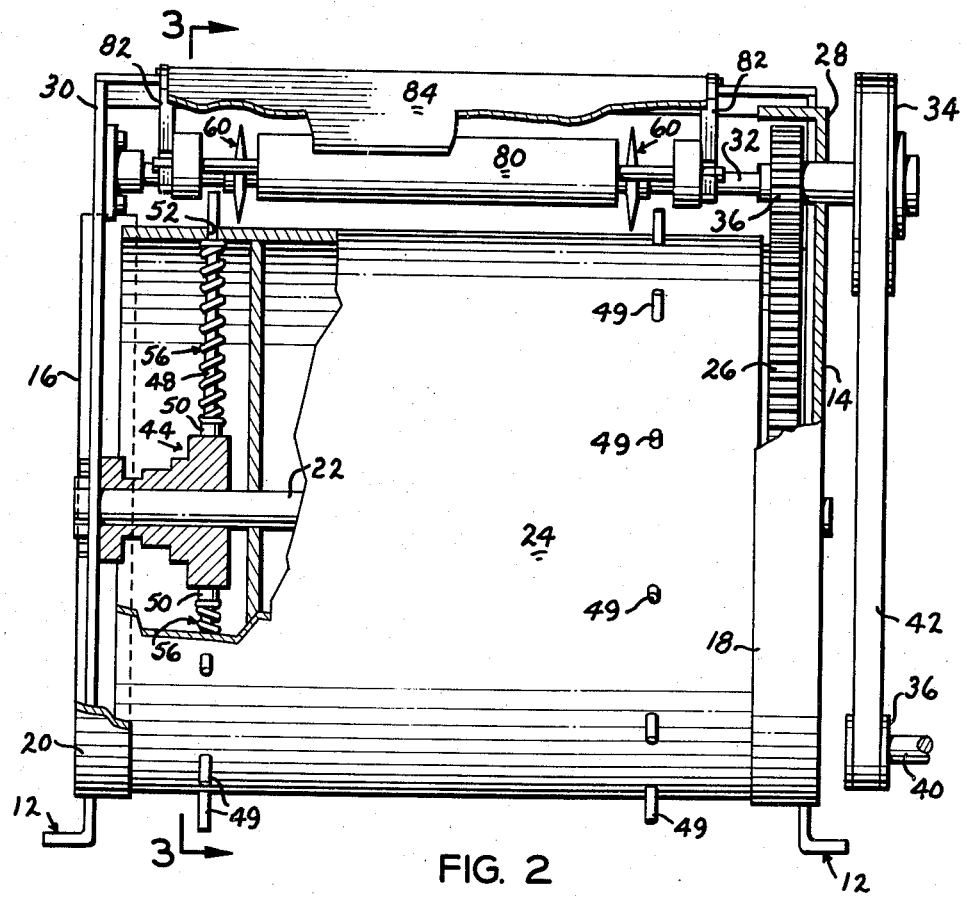
Figure 2 is a side elevational view of the device with a portion of the drum and component parts broken away to reveal parts thereunder, some of which are shown in cross section.
Figure 3:
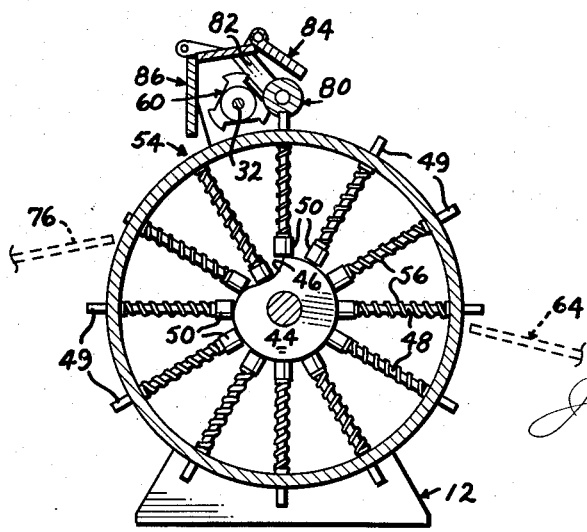
Figure 3 is a vertical cross sectional view taken substantially along line 3—3 of Fig. 2.

Interiorly of the drum and intermediate its ends, the axle 22 rigidly carries a pair of disks or cams 44 in selected spaced-apart relation. One of the cams 44 is clearly shown in Figs. 2 and 3. The major portions of the peripheral surfaces of the cams 44 are substantially concentric with the axis of the drum 24, except at a selected position where they are provided with an arcuate recess 46, for the purposes which will presently be apparent. A plurality of rods or mandrels 48 each have a circumferentially enlarged base end 50 in slidable contact with the peripheral surface of the cams 44 and an outer or head end 49 which extends radially outward from the cams 44 through suitable perforations 52 in the wall of the drum. The perforations 52 are circumferentially spaced-apart in the wall of the drum, thus forming two rows of perforations in radial alignment with the respective cam 44. The rows of perforations 52 are arranged in circumferentially staggered relation, thus disposing the outwardly projecting head ends 49 of the mandrels in circumferentially staggered relation, for the purposes which will presently be apparent. The wall of the drum is preferably of such thickness that the wall of the respective perforation 52 will support the respective mandrel 48 and rotate the same around the respective cam 44 as the drum is rotated. The length of the mandrels 48 and the depth of the recesses 46 in the cams 44 are preferably so related that the outer head ends 49 of the mandrels extend outwardly of the periphery of the drum a selected distance and may be withdrawn or retracted inwardly of the drum until each end 49 lies within the periphery of the drum, as at 54, for the purposes more fully explained hereinbelow. A helical expansion spring 56 surrounds and is interposed between the bore of the drum and the base end 50 of each respective mandrel 48 for urging the end 50 into contact with the periphery of the respective cam 44. Thus, as the drum rotates the mandrels 48, the outwardly disposed head ends 49 are retracted into the surface of the drum when the mandrel end 50 enters the cam recess 46.

A pair of knives or cutters 60, having arcuate cutting sectors 62, are carried in spaced-apart relation by the shaft 32 and extend radially outward from the shaft. As shown in the drawings, each cutter 60 comprises three cutting sectors 62 equally spaced apart circumferentially. As seen in Fig. 1, the cutting edges 62 of the respective cutters 60 are arranged in circumferentially staggered relation, for the purposes which will presently be apparent. Diametrically the cutters 60 are of such size that each cutting blade or edge 62 is disposed in closely spaced relation with regard to the periphery of the drum. Each respective cutter 60 is spaced inwardly of the respective row of mandrel ends 49.

Operation

In operation the device 10 is located adjacent a candy twirling or rolling table, not shown, having a ramp or platform 64 inclined upwardly and supported adjacent the periphery of the drum 24. The drum 24 is rotated in the direction shown by the arrow 66, and a warm pliable rope of candy 68 is manually wound around the outwardly and upwardly projecting mandrel ends 49 in a zig-zag manner as shown in Fig. 1. The cutters 60 are timed by the gears so that one of the cutting edges 62 contacts and cuts each alternate bar length of the candy rope 68 adjacent the respective mandrel end 49 around which it is wound as the drum rotates under the cutters at the points indicated by the lines 70, thus defining a candy cane 72 lying between each two scored or cut positions 70. It is not necessary that the cutters 60 completely sever the candy rope at the indicated lines 70, because scoring or partially cutting the candy leaves an indentation which, when the candy has hardened, permits the same to be easily broken at these points to separate the canes. As the drum 24 is revolved while winding the candy rope thereon, and the same is cut as disclosed hereinabove, and the mandrel ends 49 are withdrawn or retracted into the drum at the point 54, as explained hereinabove, it thus releases the rope of candy forming the candy canes. The candy canes 70, still connected as a rope but retaining the zig-zag shape of the windings on the mandrel ends 49 is received by an inclined table 76 leading to a conveyor belt, not shown, where, when the rope of candy has cooled and hardened, it is easily separated into individual canes 72, defined by the cut lines 70.

A roller 80 is horizontally journaled in parallel spaced relation with the periphery of the drum 24 between a pair of depending arms 82 carried by the frame. The purpose of the roller is to contact the rope of candy between the mandrel ends 49 and urge the candy wound therearound downwardly adjacent the surface of the drum so that the cutter edges 62 will properly contact the candy for cutting the same at the points 70. A pair of panels or lids 84 and 86 are hingedly connected at one edge to the forward and rearward sides of the frame supporting the shaft 32 and serve as guards for covering the rotating cutters 60. For this purpose panel 84 is pivoted on the upper ends of arms 82.

It seems obvious that the size of candy canes formed by the device may be varied as desired by using the desired size of feed rollers, as long as the mandrel ends 49 project outwardly from the periphery of the drum a distance sufficient to hold the candy rope.

Obviously the invention is susceptible to some change or alternation without defeating its practicability, and I therefore do not wish to be confined to the preferred embodiment shown in the drawings and described herein, further than I am limited by the scope of the appended claims.

I claim:
1. A machine for forming a pliable rope of candy into candy canes, including: a frame; a horizontally disposed axle carried by said frame; a hollow cylindrical drum axially journaled on said axle; gear teeth rigidly carried by one end of said drum adjacent the periphery thereof; a shaft journaled by said frame above said drum in parallel spaced-apart relation with the periphery thereof; means for rotating said shaft; a gear wheel coaxial with and carried by said shaft and co-operatively engaged with the gear teeth on said drum for rotating the latter when the shaft is rotated; a pair of disks coaxial with and rigidly carried by said axle intermediate the ends of said drum, each of said disks having an arcuate cam surface, said drum having two rows of circumferentially spaced-apart perforations in its peripheral wall in radial alignment with the cam surfaces of the disks; a plurality of mandrels slidably contacting the cam surface of each of said disks and extending radially outward beyond the periphery of said drum through the perforations in the peripheral wall of the latter for winding a rope of candy around the outwardly and upwardly disposed ends of the mandrels; spring means carried by each of said mandrels for urging the inwardly disposed end of each of said mandrels into contact with the cam surfaces of said disks and withdrawing the outer end of each of said mandrels into the peripheral wall of said drum when the latter is rotated for releasing the rope of candy; and a pair of cutters each having circumferentially spaced-apart cutting sectors rigidly carried in spaced-apart relation by said shaft between the two rows of perforations in said drum, the cutting sectors of one cutter arranged in circumferential staggered relation with respect to the cutting sectors of the other cutter for rotating with said shaft and cutting each alternate length of a rope of candy wound around the outer ends of the mandrels as the drum is rotated.

2. Structure as specified in claim 1, in which the means for rotating said shaft includes: a driven pulley carried by said shaft; and a power driven drive pulley drivably connected to said driven pulley.

3. Structure as specified in claim 2, in which the spring means includes, a helical expansion spring surrounding each respective said mandrel and interposed between the inwardly disposed end of the mandrel and the periphery of said drum.

4. A machine for forming a rope of pliable candy into candy canes, including: a frame having a horizontally disposed axle; a hollow cylindrical drum axially journaled by said axle, one end of said drum having a circumferential row of gear teeth; a shaft journaled by said frame in parallel spaced-apart relation with the periphery of said drum; means for rotating said shaft; a gear wheel carried by said shaft and co-operatively engaged with said gear teeth for rotating said drum when the shaft is rotated; a pair of disks rigidly connected to said axle intermediate the ends of said drum, each of said disks having an arcuate cam surface, said drum having two rows of circumferentially spaced-apart perforations in its peripheral wall in circumferentially staggered relation and radially aligned with the cam surfaces of said disks; a plurality of radially disposed mandrels slidably contacting the cam surface of each respective said disk and extending radially outward beyond the periphery of said drum through the perforations in the peripheral wall of the latter for winding a pliable rope of candy around the outwardly and upwardly disposed ends of the mandrels in a zig-zag manner while the drum is rotating; spring means carried by each respective said mandrel intermediate its ends for urging the inwardly disposed end thereof into contact with the cam surface of each respective said disk and withdrawing the outwardly disposed end of said mandrels into the peripheral surface of said drum at a point remote from the reception of a rope of candy around the outwardly disposed mandrel ends while the drum is rotating for releasing the rope of candy; and a pair of cutters each having circumferentially spaced-apart cutting sectors rigidly carried in spaced-apart relation by said shaft between the two rows of outwardly disposed mandrel ends, the cutting sectors of one cutter being arranged in circumferential staggered relation with respect to the cutting sectors of the other cutter for rotating with said shaft and cutting each alternate length of a rope of candy wound in a zig-zag manner around said mandrels as the drum is rotated.

5. Structure as specified in claim 4, in which the means for rotating said shaft includes: a driven pulley carried by said shaft; and a power driven drive pulley drivably connected to said driven pulley.

6. Structure as specified in claim 5, in which the spring means includes, a helical expansion spring surrounding each respective said mandrel and interposed between the inwardly disposed end of the mandrel and the periphery of said drum.

7. A machine for forming a pliable rope of candy into candy canes, including: a frame having a horizontally disposed axle; a hollow cylindrical drum axially journaled by said axle, one end of said drum having a circumferential row of gear teeth; a shaft journaled by said frame in parallel spaced-apart relation with the periphery of said drum; means for rotating said shaft; a gear wheel carried by said shaft and co-operatively engaged with said gear teeth for rotating said drum when the shaft is rotated; a pair of cams rigidly carried in spaced-apart relation by said axle intermediate the ends of said drum, said drum having two rows of circumferentially spaced-apart perforations in its peripheral wall in circumferentially staggered relation and radially aligned with said cams; a plurality of radially disposed mandrels slidably contacting the periphery of the respectively aligned cams and extending radially outward beyond the periphery of said drum through the perforations in the peripheral wall of the latter, whereby a pliable rope of candy may be wound in a zig-zag manner around the outwardly and upwardly disposed ends of said mandrels while the drum is rotating; spring means carried by each respective said mandrel intermediate its ends for urging the inwardly disposed end thereof into contact with the periphery of each respective cam and withdrawing the outwardly disposed end of said mandrels into the peripheral surface of said drum at a point substantially 90 degrees removed from the reception of a rope of candy around the outwardly disposed mandrel ends while the drum is rotating for releasing the rope of candy; and a pair of cutters each having circumferentially spaced-apart cutting sectors rigidly carried in spaced-apart relation by said shaft between the two rows of outwardly disposed mandrel ends for rotating with said shaft, the cutting sectors of one cutter being arranged in circumferentially staggered relation with respect to the cutting sectors of the other cutter, the sectors of said cutters being adapted to cut each alternate length of a rope of candy at a point adjacent the mandrel, when wound in a zig-zag manner around said mandrels as the drum is rotated.

8. Structure as specified in claim 7, in which the means for rotating said shaft includes: a driven pulley carried by said shaft; and a power driven drive pulley drivably connected to said driven pulley.

9. Structure as specified in claim 8, in which the spring means includes, a helical expansion spring surrounding each respective said mandrel and interposed between the inwardly disposed end of the mandrel and the periphery of said drum.

10. A machine for forming a pliable rope of candy into candy canes, including: a frame having a horizontally disposed axle; a hollow cylindrical drum axially journaled by said axle, one end of said drum having a circumferential row of gear teeth; a shaft journaled by said frame in parallel spaced-apart relation with the periphery of said drum; means for rotating said shaft; a gear wheel carried by said shaft and co-operatively engaged with said gear teeth for rotating said drum when the shaft is rotated; a pair of disks rigidly carried axially by said axle intermediate the ends of said drum, each of said disks having an arcuate cam surface, said drum having two rows of circumferentially spaced-apart perforations in its peripheral wall in radial alignment with the cam surface of the respective said disks; a plurality of mandrels slidably contacting the cam surface of each respective said disk and extending outward beyond the periphery of said drum through the perforations in the peripheral wall of the latter for winding a rope of candy around the outwardly and upwardly disposed ends of the mandrels while the drum is rotating; spring means carried by each respective mandrel intermediate its end for urging the inwardly disposed end of each respective mandrel into contact with the cam surface of said disks and withdrawing the outwardly disposed end of each of said mandrels into the periphery of said drum at a point remote from the reception of a rope of candy around the outwardly disposed mandrel ends while the drum is rotating and releasing the rope of candy; and a pair of cutters each having circumferentially spaced-apart cutting sectors rigidly carried in spaced-apart and circumferentially staggered relation by said shaft between the two rows of outwardly disposed mandrel ends, the cutting sectors of one cutter being arranged in circumferentially staggered relation with respect to the cutting sectors of the other cutter for rotating with said shaft and cutting each alternate length of a rope of candy wound around the outer ends of said mandrels as the drum is rotated.

11. Structure as specified in claim 10, in which the means for rotating said shaft includes: a driven pulley carried by said shaft; and a power driven drive pulley drivably connected to said driven pulley.

12. Structure as specified in claim 11, in which the spring means includes, a helical expansion spring surrounding each respective said mandrel and interposed between the inwardly disposed end of the mandrel and the periphery of said drum.

13. A machine for forming a pliable rope of candy into candy canes, including: a frame; a hollow cylindrical drum horizontally journaled by said frame; a shaft journaled by said frame above said drum in parallel spaced relation with the periphery of the latter; means for rotating said shaft and said drum; cam means carried by said frame within said drum, the peripheral wall of said drum having a plurality of perforations for forming two rows of perforations in circumferentially spaced-apart and angularly staggered relation, said two rows of perforations disposed in radial alignment with said cam means; a plurality of similar mandrels each having one end slidably contacting said cam means and projecting radially outwardly through the respective perforations in said drum; spring means carried by each of said mandrels for urging the inwardly disposed end of each of said mandrels into contact with said cam means, whereby a pliable rope of candy may be manually wound around the outwardly and upwardly disposed mandrel ends in a zig-zag manner at one position of the drum and whereby the spring means withdraws the outwardly disposed ends of the mandrels into the periphery of the drum at a point angularly removed from the point of reception of the rope of candy for releasing the latter; and cutter means carried by said shaft and adapted to cut a rope of candy wound around the outer ends of said mandrels at selected points adjacent the mandrel ends while the drum is rotating.

References Cited in the file of this patent

UNITED STATES PATENTS 2,175,089   Page _____ Oct. 3, 1939